United States Patent Office 3,536,659
Patented Oct. 27, 1970

3,536,659
STABILIZING VINYL CHLORIDE RESINS WITH A LEAD CARBONATE-LEAD SULFATE COPRECIPITATE
Walter Breckheimer, Bensberg, and Wilhelm Kunz, Cologne, Mulheim, Germany, assignors to Firma Oskar Neynaber & Co. AG., Loxstedt bei Bremerhaven, Germany, a corporation
No Drawing. Filed Apr. 3, 1967, Ser. No. 627,622
Claims priority, application Germany, Apr. 6, 1966, N 28,353
Int. Cl. C08f 45/56
U.S. Cl. 260—45.75                  6 Claims

ABSTRACT OF THE DISCLOSURE

Process for stabilizing polymers of the polyvinyl chloride type which tend to split off hydrogen chloride by incorporating therein a coprecipitate of basic lead crabonate and lead sulfate, prepared by adding less than stoichiometrically required amount of sulfuric acid and carbon dioxide to a slurry of lead monoxide in water and thermally treating the filtered, washed and dried coprecipitation product thereby formed. Polyvinylchloride type resins stabilized with the above thermally treated coprecipitate are also described.

---

This invention relates to a process for stabilizing polymers of the polyvinyl chloride type which split off hydrogen chloride.

Plastic compositions containing polyvinyl chloride are subjected to thermal stresses during the processing operations and are subjected to further stresses, e.g. by heat and light, after processing. These stresses result in the evolution of hydrogen chloride, which causes accelerated degradation of the plastic compositions. For this reason, stabilizers minimizing the detrimental effect of the decomposition products must be added to PVC-containing plastic compositions. Basic lead compounds such as basic lead carbonate and various lead sulfates have been found to be efficient long ago. Most widely known are di-, tri- and tetrabasic lead sulfates and white lead which is a dibasic lead carbonate. It is also known that a particularly satisfactory stabilizing effect which is markedly superior to that otbained with the other basic lead compounds mentioned above, especially in plasticized PVC, is obtainable with anhydrous basic lead carbonate having the composition $PbO \cdot PbCO_3$.

However, basic lead compounds prepared from an aqueous phase contain a more or less large amount of water of constitution and varying amounts of carbon dioxide which may be split off in the plastic composition by heavy thermal stress and may lead to formation of bubbles and cracking in the plastic material. This phenomenon has particularly disadvantageous effects in case of dibasic hydrous lead carbonate (white lead) which has a water content of about 2% and a $CO_2$ content of about 13%. Dibasic lead sulfates, due to the production, contain small amounts of carbon dioxide and, moreover, 0.5 to 2% of water of constitution.

Carbon dioxide may be split off to an increased extent especially at high processing temperatures with simultaneous high shear forces, and this extent may still be increased by certain other additives contained in PVC compositions such as lead stearate and lower molecular weight plasticizers or chlorinated paraffins.

While the tendency of anhydrous $PbO \cdot PbCO_3$ to gassing is lower than that of white lead, it may also give rise to troublesome evolution of $CO_2$ in specific formulations under certain extreme conditions of processing.

It has now been found that stabilizers which impart to the plastic material not only very satisfactory thermal stability but which have also a very low tendency to gassing are obtained by modifying basic lead carbonates with the thermally more stable basic lead sulfate in the form of a coprecipitate.

It is an object of the present invention to provide a process for stabilizing polymers of the PVC type which split off hydrogen chloride, the process comprising using a basic lead carbonate which is modified with basic lead sulfate.

The preparation of inorganic basic lead compounds is known (U.S. Pat. 2,249,330). It is effected by adding a specific amount of the acid the lead compound of which is desired to a stirred slurry of lead monoxide in water which contains a reaction promoter such as acetic or nitric acid. The resultant suspension is filtered, washed, dried and ground. It is also possible in this manner to prepare lead coprecipitates by adding several acids (German published application 1,068,237).

The basic lead carbonate modified with basic lead sulfates is prepared according to this known principle by adding sulfuric acid and carbon dioxide in amounts less than those stoichiometrically required to a slurry of lead monoxide in water in any order, filtering and washing the coprecipitate of basic lead carbonate and basic lead sulfate, drying the filter cake and thereafter subjecting it to a thermal treatment. The lead monoxide slurry should desirably contain a reaction promoter, e.g. nitric or acetic acid, in the absence of which the reaction is difficult to start in most cases.

The carbonate portion is desirably precipitated by introducing $CO_2$ into the lead monoxide slurry. It should be considered that larger amounts of carbon dioxide are taken up only at temperatures of below about 50° C. When precipitating the carbonate first, it is desirable, therefore, to oeprate below this limit, especially at room temperature. The quantity of carbon dioxide introduced is desirable selected such that the carbonate content of the finished product does not exceed about 8% (calculated from the loss on ignition of a dried sample which has not been subjected to thermal treatment).

When adding sulfuric acid, white-colored lead compounds which, according to analysis, have higher basicity than tetrabasic lead sulfate are obtained at temperatures in excess of about 95° C. It is the principle of the precipitation that white-colored lead compounds of highest possible basicity are prepared. Therefore, the precipitation with sulfuric acid should be carried out advantageously above 95° C.

The addition of acid, i.e. the reaction is only effected to the point where the color of the suspension has just changed from the yellowish color of the lead monoxide slurry to white. This "white point" can be readily perceived visually.

The subsequent thermal treatment of the precipitated product is critical for the stabilizing effect. This treatment results in removal of the water of constitution and the readily cleavable portion of carbon dioxide and gives both an improvement in the long time thermal stability and a reduction in the tendency to gassing. It is essential that as extensive and rapid a cleavage as is possible is effected under mild conditions which must be maintained because they have a decisive influence on particle size and particle structure. A treating temperature of 150 to 300° C., preferably of 200 to 230° C. is used. The treating time is dependent upon the degree of dehydration desired. In addition, a limit is set to it by the fact that sintering and crystal growth of the product must not occur. In practice, a treating time of about 2 to 4 hours is used with the temperature being in the preferred range of 200 to 230° C.

It is essential for the thermal treatment step that a reaction promotor which accelerates the decomposition is present. In the absence of such materials, the decomposition takes such a long time that the activity of the compound is reduced by sintering. Lower carboxylic acids, preferably acetic and propionic acids, and salts thereof, especially the lead salts of these acids, have been found to be particularly suitable decomposition catalysts. These decomposition catalysts may be added to the reaction mixture at any point, but, at any rate, prior to the thermal treatment. However, it is also possible to form these catalysts in situ by adding to the lead monoxide slurry or to the filter cake a small amount of acetic or propionic acid or, in place of the acids, directly the corresponding salts. The amounts of this decomposition catalyst are not critical. However, it is desirable to use about 0.1 to 1% by weight, based on the total weight of dry substance.

It is preferred to use a basic lead carbonate with 50 to 85% and preferably 60 to 80% of basic lead sulfate.

The preparation of the stabilizer used in accordance with the invention is illustrated by the following examples, it being not intended to limit the invention to these examples.

EXAMPLE 1

1.6 milliliters of 80% acetic acid are added to a slurry of 200 g. of lead monoxide in 840 ml. of water while stirring. Then a mixture of 44 ml. of 20% sulfuric acid and 220 ml. of water is slowly added at room temperature. Carbon dioxide is then introduced into the suspension which is still slightly yellow due to residual lead monoxide until the precipitation product is almost white. The sludge filtered off and washed is mixed with 6 ml. of a 10% lead acetate solution. The filter cake is dried in a drying cabinet at 110° C. and comminuted after drying. The product is then heated for 3 hours to 230° C. in a laboratory furnace. About 2.6% of water and carbon dioxide are split off under these conditions. The stoichiometrically calculated portion of basic lead carbonate is 40%, that of basic lead sulfate 60%.

EXAMPLE 2

After addition of 2 ml. of 80% acetic acid, carbon dioxide is introduced into a slurry of 200 g. of lead monoxide in 840 ml. of water until the loss on ignition of a dried sample is 4.4%. The suspension is then heated to about 97° C. and mixed with 5% sulfuric acid until the suspension has just turned white. The product is filtered, washed, dried at 120° C. and ground. Thereafter, 10 ml. of a 5% propionic acid are added. The mixture is then heated for 3 hours to 230° C. This results in a loss in weight of about 1.4%. The analysis shows a loss on ignition (carbon dioxide) of 2.95%, a $SO_3$ content of 4.1% and a PbO content of 92.95%.

The stabilizing properties of the basic lead compounds according to the invention are illustrated by the experiments described hereafter. The stabilizing effect is dependent upon the type of the PVC used and the overall formulation. The stabilizing effect was studied on both rigid and plasticized polyvinyl chloride. Comparative tests were made with commercially available basic lead stabilizers. It had to be considered that the latter still contain frequently small amounts of auxiliary stabilizers intended to influence favorably the degradation process of the PVC and the additives (for example, plasticizers and lubricants). Examples hereof include antioxidants such as p-octylphenol and bisphenol A.

Recipe for PVC compositions (a) Plasticized PVC
100 p. polyvinyl chloride
50 p. plasticizer
1 p. lubricant
3 p. lead stabilizer (b) Rigid PVC
100 p. polyvinyl chloride
1 p. lubricant
3 p. lead stabilizer To determine the thermal stability, a suspension polyvinyl chloride having a K value of 70 (Vinnol H 100/70f), dioctyl phthalate (Vestinol AH) as plasticizer and E-wax (Hoechst) as lubricant were used. Films were manufactured from the compositions on a mill using a roller temperature of 170° C. and a milling time of 10 minutes.

The films were kept in a furnace at 180° C. A sample was taken every 10 minutes thereby determining the break-off time, i.e. the duration of heat storage after which the PVC film acquires a dark brown color and the mass has undergone chemical degradation to a point where it has become useless. Results which were obtained in the same furnace under comparable conditions were only compared in these tests.

TABLE I

| Stabilizer | Break-off time, min. | |
|---|---|---|
| | Plasticized PVC | Rigid PVC |
| (1) Basic lead sulfate-carbonate prepared according to Example 1 | 480 | 290 |
| (2) Dibasic lead sulfate | 260 | 200 |
| (3) Tribasic lead sulfate | 360 | 210 |
| (4) Tetrabasic lead sulfate | 220 | 190 |

The improvements in thermal stability time obtained by means of the product according to the invention are about 30 to 110% for plasticized PVC and about 35 to 50% for rigid PVC, based on the basic lead sulfates.

For other PVC types, the improvements in thermal stability times are partially still more obvious, but, in several cases, inferior to those obtained with commercially available basic lead stabilizers. Thus, when comparing the product obtained according to Example 1 with basic lead sulfate stabilizers which are commercially available, an improvement of only about 25 to 45% was found for the plasticized PVC composition and one of about 25 to 30% for the rigid PVC composition. This effect is due to the fact that the commercially available lead stabilizers have admixed small amounts of additives which have a synergistic or antioxidant effect and which may improve premature discoloration and thermal stability. Therefore, only the pure lead compounds should be compared all the more since the same additives may show different behavior when added to different types of lead compounds. The products according to the invention are capable of being markedly improved by additives, but the pure compounds are already superior to the commercially available products mixed with "auxiliary stabilizers."

The results shown in Table II are to illustrate the extent to which the performance of the products of the invention differs from that of mechanical mixtures of separately prepared basic lead sulfates and carbonates.

TABLE II

| Stabilizer | Break-off time, min. | |
|---|---|---|
| | Plasticized PVC | Rigid PVC |
| (1) Basic lead sulfate/lead carbonate (30:70) prepared according to Example 1 | 420 | 270 |
| (2) White lead ($2PbCO_3 \cdot Pb(OH)_2$) | 330 | 330 |
| (3) Tetrabasic lead sulfate | 210 | 210 |
| (4) 70% tetrabasic lead sulfate plus 30% white lead (prepared separately) | 230 | 230 |
| (5) Mixture (4) subjected to thermal after-treatment as (1) | 260 | 240 |

It is to be observed in connection with this series of tests that commercially available white lead due to its tendency to gassing, can be used in rigid PVC compositions to a limited extent only so that the higher value found in hte present case actually dos not characterize superiority.

In Table III, the results obtained with the product of this invention prepared according to Example 2 are compared with corresponding products of comparable chemical composition obtained by mixing the aqueous slurries of pure basic lead sulfates and carbonates, filtration, drying and thermal aftertreatment.

TABLE III

| Stabilizer | Break-off time, min. | |
|---|---|---|
| | Plasticized PVC | Rigid PVC |
| (1) Basic lead sulfate/lead carbonate prepared according to Example 2 | 490 | 260 |
| (2) Basic lead sulfate/lead carbonate prepared by mixing the slurries of separately precipitated salts and subjected to thermal aftertreatment for 3 hours at 230° C | 220 | 230 |
| (3) (2) without thermal treatment | 190 | 230 |
| (4) Tribasic lead sulfate stabilizer, commercially available | 310 | 210 |
| (5) Commercially available tetrabasic lead sulfate stabilizer | 320 | 200 |
| (6) Prepared according to Example 1 coprecipitated, no thermal treatment [1] | 330 | 240 |
| (7) (6) after thermal treatment [1] | 440 | 250 |

[1] Tests (6) and (7) cannot be compared directly with tests (1) to (5) because drying and thermal treatment have not been effected in the same furnace so that variations of the measured results are possible. Nevertheless, it is obvious here again that the breakoff time of the thermally treated coprecipitate of test (6) approaches closely that of test (1).

It is clearly obvious from Tables I to III that the two factors, i.e. coprecipitation and thermal treatment, are equally important for obtaining a satisfactory stabilizer. The stabilizing effect of the coprecipitates according to the invention is not achieved either by separately precipitated products even if they have been subsequently mixed and subjected to thermal treatment or by coprecipitated but not thermally treated products.

The thermal stability of PVC compositions containing the compounds according to the invention in dependence upon the ratio of basic lead sulfate/basic lead carbonate is illustrated by Table IV. The products have been prepared according to Example 2. The compositions determined by analysis are also shown.

TABLE IV

| Stabilizer | PbO·PbCO$_3$, percent | Basic PbSO$_4$, percent | Break-off time, minutes | |
|---|---|---|---|---|
| | | | Plasticized PVC | Rigid PVC |
| (1) Basic lead carbonate | 100 | 0 | 560 | 300 |
| (2) Basic lead compounds of Example 2 having different lead sulfate/lead carbonate ratio: | | | | |
| (a) | 76.5 | 23.5 | 540 | 280 |
| (b) | 65 | 35 | 540 | 390 |
| (c) | 55 | 45 | 510 | 260 |
| (d) | 44 | 56 | 500 | 260 |
| (e) | 33 | 67 | 490 | 250 |
| (f) | 21 | 79 | 450 | 260 |
| (g) | 11 | 89 | 360 | 210 |
| (3) Dibasic lead sulfate | 0 | 100 | 260 | 200 |
| (4) Tribasic lead sulfate | 0 | 100 | 360 | 210 |
| (5) Tetrabasic lead sulfate | 0 | 100 | 220 | 190 |

In Table IV, the proportions of PbO·PbCO$_3$ and basic lead sulfate have been calculated as follows:

The content of PbO·PbCO$_3$ is calculated from the CO$_2$ content found. This compound is stable under the conditions used to prepare it. The remainder of the lead oxide is expressed as basis lead sulfate. From the SO$_3$ contents found, a basicity corresponding to an almost pentabasic lead sulfate results for the basic lead sulfate portion. It is clearly obvious from this summary that the thermal stability times of the plasticized PVC composition decrease markedly as the PbCO$_3$ content decreases. The disadvantages of pure PbO·PbCO$_3$ have been discussed above. They consist in a tendency to formation of bubbles in the PVC compositions in case of high mechanical or thermal stress. The dependence of this tendency to formation of bubbles was studied by preparing rigid PVC profiles of 6 x 8 mm. diameter on an extruder and evaluating the formation of bubbles on microtome sections under a microscope after having kept the samples for 30 minutes at a temperature of 200° C. In formulations containing 100 parts of Solvic 229 and 1.5 parts of E-wax, the products according to the invention having PbO·PbCO$_3$ contents of 44% and 33% were compared with tribasic and tetrabasic lead sulfate, PbO·PbCO$_3$ and white lead. Gassing is most pronounced in case of white lead. It is markedly more favorable for PbO·PbCO$_3$ while differences in gassing between the products of the invention mentioned above and basic lead sulfates cannot be observed.

Thus, as compared with pure basic lead sulfates, the products of the invention have the advantage of markedly improved thermal stabilization and their advantage over pure PbO·PbCO$_3$ is a largely reduced tendency to formation of bubbles in PVC compositions subjected to high stresses.

It is obvious from the test results shown above that, surprisingly, mixtures of basic lead sulfates and basic carbonates show by no means additive behavior, which is actually contrary to expectations and that mixtures (see Table II, Test 5) give rather substantially poorer results for the thermal stability time than do coprecipitates subjected to thermal treatment according to the invention (see Table IV, e.g. Tests 2(e) and 2(f)). It is only coprecipitation and subsequent thermal treatment which give a system of basic lead carbonate/basic lead sulfate in which the properties of this system approach those of one component as the content of this component increases.

What is claimed is:

1. A composition comprising a vinyl chloride polymer and a stabilizing amount of a coprecipitate of basic lead carbonate and basic lead sulfate, prepared by adding less than the stoichiometrically required amount of sulfuric acid and carbon dioxide to a slurry of lead monoxide in water containing a reaction promotor, filtering, washing and drying said coprecipitate and thereafter thermally treating said coprecipitate at temperatures of 150° C. to 300° C.

2. A composition according to claim 1 wherein said thermal treatment is conducted at a temperature of 200° C. to 230° C.

3. A composition according to claim 1 wherein said thermal treatment is carried out in the presence of a decomposition catalyst.

4. A composition according to claim 3 wherein said decomposition catalyst is a member selected from the group consisting of lead acetate and lead propionate.

5. A composition according to claim 1 wherein a coprecipitate contains 50 to 85% basic lead sulfate, the remainder being basic lead carbonate.

6. A composition according to claim 5 wherein said coprecipitate contains 60–80% basic lead sulfate.

References Cited

UNITED STATES PATENTS

| 2,625,521 | 1/1953 | Fischer et al. | 260—23 |
| 2,629,700 | 2/1953 | Caldwell et al. | 260—23 |
| 2,874,145 | 2/1959 | Hendricks et al. | 260—45.75 |
| 3,355,420 | 11/1967 | Friedmann et al. | 260—45.75 |
| 3,312,647 | 4/1967 | Szczepanek et al. | 260—23 |

DONALD E. CZAJA, Primary Examiner

V. P. HOKE, Assistant Examiner

U.S. Cl. X.R.

23—68, 127